(12) United States Patent
Vasko et al.

(10) Patent No.: US 8,285,090 B2
(45) Date of Patent: Oct. 9, 2012

(54) SERIAL OPTICAL DATA TRANSMISSION SYSTEM WITH DISPLACEABLE OPTICAL PATHWAY

(75) Inventors: David A. Vasko, Solon, OH (US); Robert E. Lounsbury, Chardon, OH (US); Kenwood H. Hall, Hudson, OH (US); Nathan J. Molnar, Shaker Heights, OH (US); Douglas R. Bodmann, Shaker Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 386 days.

(21) Appl. No.: 12/728,063

(22) Filed: Mar. 19, 2010

(65) Prior Publication Data

US 2011/0229124 A1    Sep. 22, 2011

(51) Int. Cl.
*G02B 6/26*    (2006.01)
(52) U.S. Cl. .............. 385/25; 385/16; 385/19; 385/24; 385/50; 700/21

(58) Field of Classification Search .............. None
See application file for complete search history.

(56) References Cited

U.S. PATENT DOCUMENTS

| | | | | |
|---|---|---|---|---|
| 5,727,099 | A * | 3/1998 | Harman | 385/52 |
| 2003/0133648 | A1 * | 7/2003 | Mitsuoka et al. | 385/22 |
| 2003/0208283 | A1 * | 11/2003 | Vasko et al. | 700/21 |
| 2004/0264848 | A1 * | 12/2004 | Lee et al. | 385/22 |
| 2006/0165347 | A1 * | 7/2006 | Mita | 385/16 |

* cited by examiner

*Primary Examiner* — Hemang Sanghavi
(74) *Attorney, Agent, or Firm* — Fletcher Yoder; R. Scott Speroff; John M. Miller

(57) ABSTRACT

A serial optical data transmission system is provided. The serial optical data transmission system includes a displaceable optical pathway disposed adjacent to a slot configured to receive a first monitoring and/or control module. The optical pathway is biased towards a serial optical data bus position for transmission of optical data to or from at least one second monitoring and/or control module when the first monitoring and/or control module is removed from the slot. Further, the optical pathway is displaced from the serial optical data bus position when the first monitoring and/or control module is in the slot.

20 Claims, 4 Drawing Sheets

SERIAL OPTICAL DATA TRANSMISSION SYSTEM WITH DISPLACEABLE OPTICAL PATHWAY

BACKGROUND

The present invention relates generally to optical data transmission systems, such as for distribution of optical signals to controlling and/or to controlled equipment, and particularly to a displaceable optical pathway for such electrical systems.

Electrical systems such as employed in industrial automation applications include packaged electrical and electronic components supported by backplanes. For example, industrial controllers employ specialized computers and other electronic circuitry to control industrial processes and machines. The components/modules of the industrial controller are typically assembled with a backplane within a rack that provides for interconnection between the modules. Certain systems employ serial fiber optic backplanes that include a network of optical fibers to transfer optical data between the electrical components and modules of such systems.

It may be required to remove and insert certain modules or components of the system from time-to-time. For example, a faulty module may be required to be removed and replaced with another module. Certain systems employ active components such as switches on the backplane to maintain connection between the modules, which add additional cost and are typically limited only to specific applications Certain other systems employ a ring implementation such as the Device Level Ring (DLR) protocol for maintaining the connection between the modules. However, such implementations can facilitate connection only for one missing module from the system.

Accordingly, it would be desirable to develop an optical data transmission system that facilitates insertion and removal of components of system under power.

BRIEF DESCRIPTION

Briefly, according to one embodiment of the present invention, a serial optical data transmission system is provided. The serial optical data transmission system includes a displaceable optical pathway disposed adjacent to a slot configured to receive a first monitoring and/or control module. The optical pathway is biased towards a serial optical data bus position for transmission of optical data to or from at least one second monitoring and/or control module when the first monitoring and/or control module is removed from the slot. Further, the optical pathway is displaced from the serial optical data bus position when the first monitoring and/or control module is in the slot.

In accordance with another aspect, a serial optical data transmission system is provided. The serial optical data transmission system includes a plurality of monitoring and/or control modules configured to perform monitoring and/or control function for a machine system. The serial optical data transmission system also includes a serial optical backplane disposed adjacent to the plurality of monitoring and/or control modules. The serial optical backplane includes a plurality of displaceable optical pathways disposed on the serial optical backplane, wherein each of the plurality of displaceable optical pathways is configured to be biased towards a serial optical data bus position upon removal of one or more monitoring and/or control modules and is configured to maintain transmission of optical data between the other monitoring and/or control modules of the serial optical data transmission system.

In accordance with another aspect, a serial optical backplane supporting a plurality of monitoring and/or control modules is provided. The backplane includes a plurality of displaceable optical pathways, each optical pathway being configured to maintain transmission of optical data between the monitoring and/or control modules by biasing towards a serial optical data bus position upon removal of one or more monitoring and/or control modules from the backplane.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present technique function to provide a serial optical data transmission system. In particular, the present technique provides displaceable optical pathways that facilitate removal and/or insertion of modules such as monitoring and/or control modules from and/or into the serial optical data transmission system.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
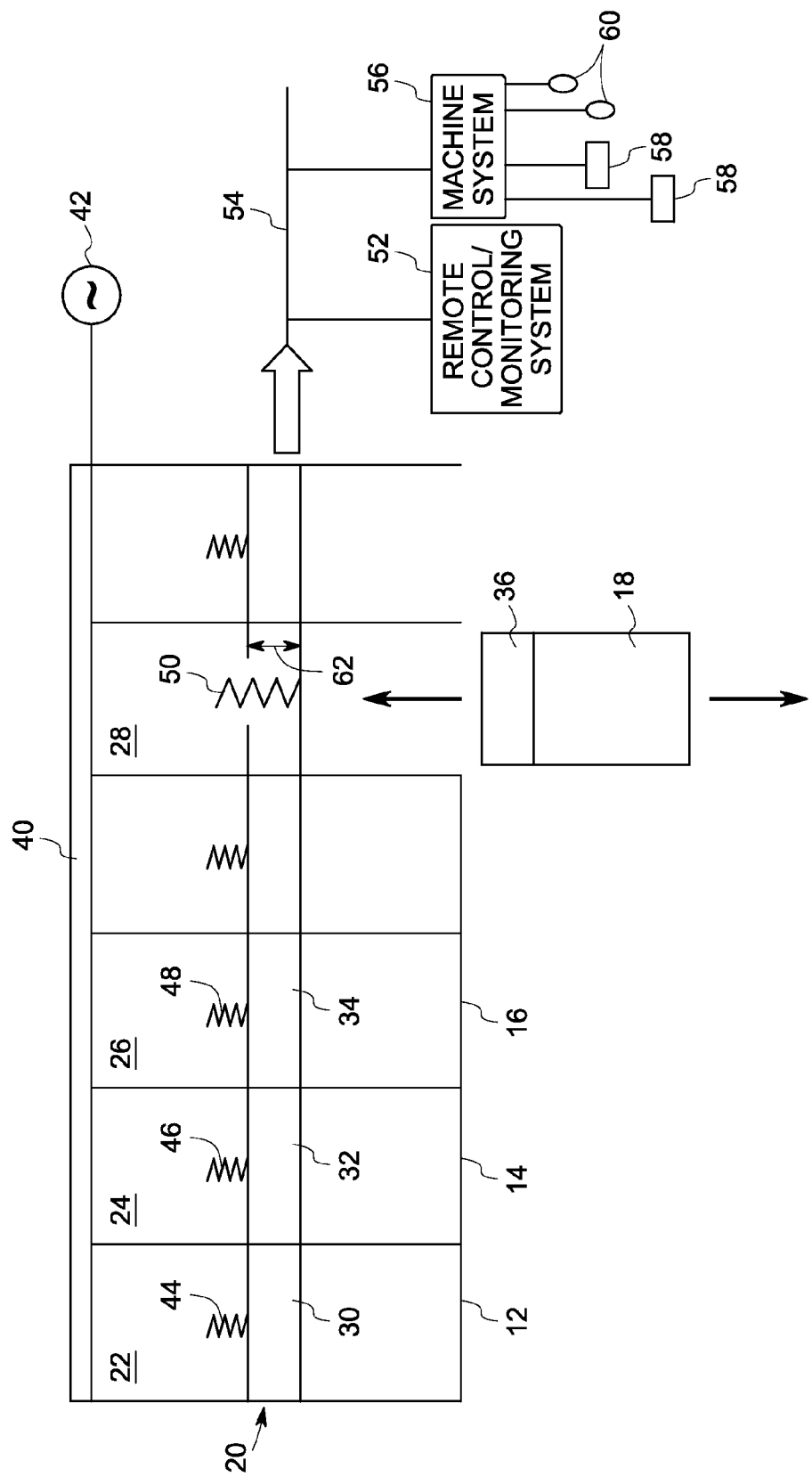
FIG. 1 illustrates a serial optical data transmission system in accordance with aspects of the present invention.

Turning now to drawings and referring first to FIG. 1, a serial optical data transmission system 10 is illustrated. The serial optical data transmission system 10 includes a plurality of monitoring and/or control modules such as represented by reference numerals 12, 14, 16 and 18 respectively. The plurality of monitoring and/or control modules 12, 14, 16 and 18 may be housed within a rack of the system 10. The rack may be made of any suitable material, such as heavy gage sheet metal, reinforced plastics, and so forth.

Furthermore, the system 10 includes a serial optical backplane 20 disposed adjacent to the plurality of monitoring and/or control modules 12, 14, 16 and 18. The serial optical backplane 20 may be disposed at the rear of the rack and functions as the mounting structure for the modules 12, 14, 16 and 18 and other components within the rack. As used herein, the term "backplane" includes mounting structures supporting individual modules, interconnected modules or distributed interconnected modules of a system.

The serial optical backplane 20 includes a plurality of displaceable optical pathways such as represented by reference numerals 22, 24, 26 and 28 disposed on the backplane 20. Each of the optical pathways 22, 24, 26 and 28 includes more than one optical signal transmission conductor. In one exemplary embodiment, each of the optical pathways 22, 24, 26 and 28 includes two optical signal transmission conductors. In the illustrated embodiment the optical signal transmission conductors of the optical pathways 22, 24, 26 and 28 are represented by reference numerals 30, 32, 34, and 36 respectively.

It should be noted that the number of the optical signal transmission conductors may be selected based upon a desired module configuration. In the illustrated embodiment, the optical signal transmission conductors provide a serial channel path for optical data transmission between the modules 12, 14, 16 and 18. The data transmission may be through channels communicating between only two modules or through shared channels communicating among multiple modules of the system 10. It should be noted that though the present implementation describe serial connection between the modules 12, 14, 16 and 18, other configurations to provide parallel and/or serial connection using the displaceable optical pathways are within the scope of the invention.

The system 10 also includes a power bus 40 configured to provide power from a power source 42 to each of the plurality of modules 12, 14, 16 and 18. In the illustrated embodiment, each of the displaceable optical pathways 22, 24, 26 and 28 is configured to be biased towards a serial optical data bus position upon removal of one or more monitoring and/or control modules 12, 14, 16 and 18. Advantageously, such optical pathways 22, 24, 26 and 28 maintain transmission of optical data between the other monitoring and/or control modules of the system 10.

In the illustrated embodiment, the system 10 includes one optical backplane 20 supporting the monitoring and/or control modules 12, 14, 16 and 18. As will be appreciated by one skilled in the art, the system 10 may include a plurality of optical backplanes connected in series and disposed adjacent to the plurality of monitoring and/or control modules 12, 14, 16, 18. Moreover, each of the plurality of optical backplanes may include the displaceable optical pathways such as described above.

In this embodiment, each of the optical pathways 22, 24, 26 and 28 is biased towards the serial optical data bus position via a spring such as represented by reference numerals 44, 46, 48 and 50 respectively. However, other biasing mechanisms may be employed. In certain embodiments, the system 10 may include sensing and processing circuitry to measure the alignment of each of the optical pathways 22, 24, 26 and 28 in a displaced position. Further, the sensing and processing circuitry may determine transmission losses between the coupled monitoring and/or control modules of the system 10. The alignment and transmission losses may be compared with pre-determined thresholds to determine the quality of the connection and if required the position of the optical pathways and/or the modules may be adjusted. In certain other embodiments, electrical adjustments are made to compensate for losses. These adjustments may be as a result of the remote control monitoring and management system within.

In one embodiment, the monitoring and/or control modules 12, 14, 16 and 18 are coupled to a remote control and/or monitoring system 52 for a machine and/or a process via network 54. Furthermore, the monitoring and/or control modules 12, 14, 16 and 18 may be coupled to a monitored/controlled machine system 56. Each of the monitoring and/or control modules 12, 14, 16 and 18 includes circuitry (not separately represented in the figure) within the respective module for receiving and transmitting optical data to and/or from another module. Such optical data may be utilized to monitor and/or control operation of the components such as actuators 58 and sensors 60 of the machine system 56.

In certain embodiments, the system 10 may include a mechanical keying mechanism to facilitate connection between specific modules of the system 10. The mechanical keying mechanism may receive such inputs from a user of the system 10. Advantageously, such mechanism prevents coupling of un-desirable modules to the system 10.

In one exemplary embodiment, each of the plurality of optical pathways such as the optical pathway 28 is disposed adjacent to a slot configured to receive a monitoring and/or control module 18. In operation, the optical pathway 28 is biased towards a serial optical bus position 62 for transmission to or from at least one other monitoring and/or control module such as module 16 when the module 18 is removed from the respective slot. In an alternate embodiment, the optical pathway 28 is displaced from the serial optical bus position 62 when the monitoring and/or control module 18 is in the respective slot. An exemplary configuration of the optical pathway 28 will be described below with reference to FIG. 3.

Figure 2:
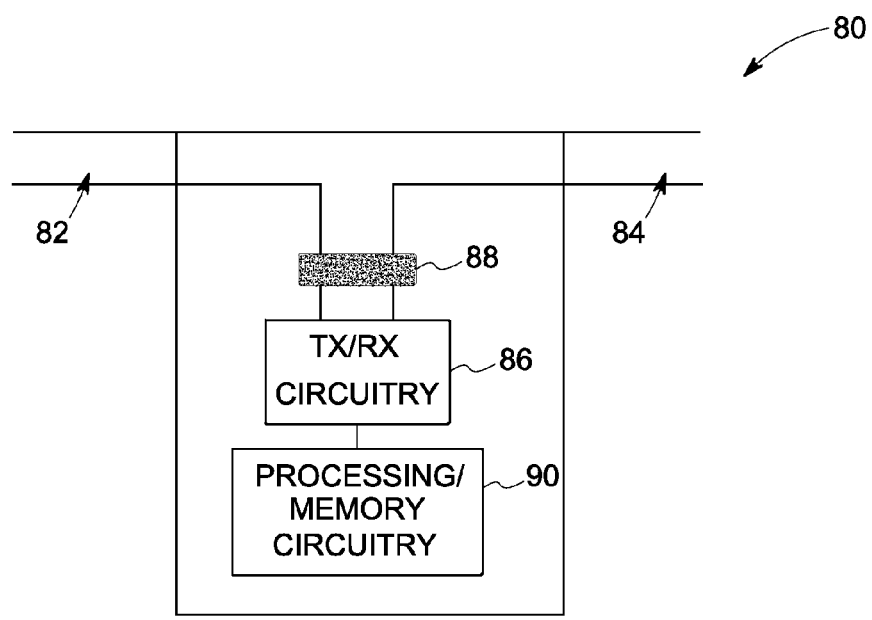
FIG. 2 illustrates an exemplary configuration of a monitoring and/or control module of the serial optical data transmission system of FIG. 1.

FIG. 2 illustrates an exemplary configuration 80 of a monitoring and/or control module such as 12 of the serial optical data transmission system 10 of FIG. 1. As illustrated, the module 80 includes optical signal transmission conductors such as represented by reference numerals 82 and 84 respectively for receiving and transmitting optical data to and/or from another monitoring and/or control module. Further, the module 80 includes receiving and transmitting circuitry 86 configured to receive the optical data and retransmit the optical data to at least one another monitoring and/or control module such as module 14 of the optical data transmission system 10.

In the illustrated embodiment, the module 80 also includes a module optical bypass switch 88 having a first state in which the switch 88 passes the optical data along to or from at least one other monitoring and/or control module. Further, the switch 88 operates in a second state in which the switch passes the optical data to other circuitry within the module 80. In certain embodiments, the switch 88 includes micro-electro mechanical system (MEMS) switch elements. Other switching devices may include liquid crystals, electro-optic devices, etc.

In this embodiment, the module includes a processing/memory circuitry 90 coupled to the receiving and transmitting 86 and configured to perform a monitoring and/or control function for a machine system based upon the optical data. As will be apparent to those skilled in the art, a wide range of such modules may be envisaged, having various processing, memory and support circuitry for carrying out various computations, executing monitoring and/or control functions, communicating with remote devices (e.g., remote computers), receiving and processing input signals, providing output signals, and so forth.

It should be noted that the present invention is not limited to any particular processing circuitry for performing the processing tasks of the invention. The term "processing circuitry," as that term is used herein, is intended to denote any machine capable of performing the calculations, or computations, necessary to perform the tasks of the invention. The term "processing circuitry" is intended to denote any machine that is capable of accepting a structured input and of processing the input in accordance with prescribed rules to produce an output.

For example, the processing circuitry may be configured to process optical data received from different monitoring and/or control modules and to generate control signals for controlling the operation of the machine system 56. In typical industrial settings, for example, the functions of such circuitry may include receiving input or feedback signals from motors or other controlled equipment, processing and/or reporting states of the equipment, and outputting signals for control of the equipment.

It should also be noted that the phrase "configured to" as used herein" means that the processing circuitry is equipped with a combination of hardware and software for performing the tasks of the invention, as will be understood by those skilled in the art.

The memory circuitry may include, but are not limited to, hard disk drives, optical drives, tape drives, random access memory (RAM), read-only memory (ROM), programmable read-only memory (PROM), redundant arrays of independent disks (RAID), flash memory, magneto-optical memory, holographic memory, bubble memory, magnetic drum, memory stick, Mylar® tape, smartdisk, thin film memory, zip drive, and so forth.

Figure 3:
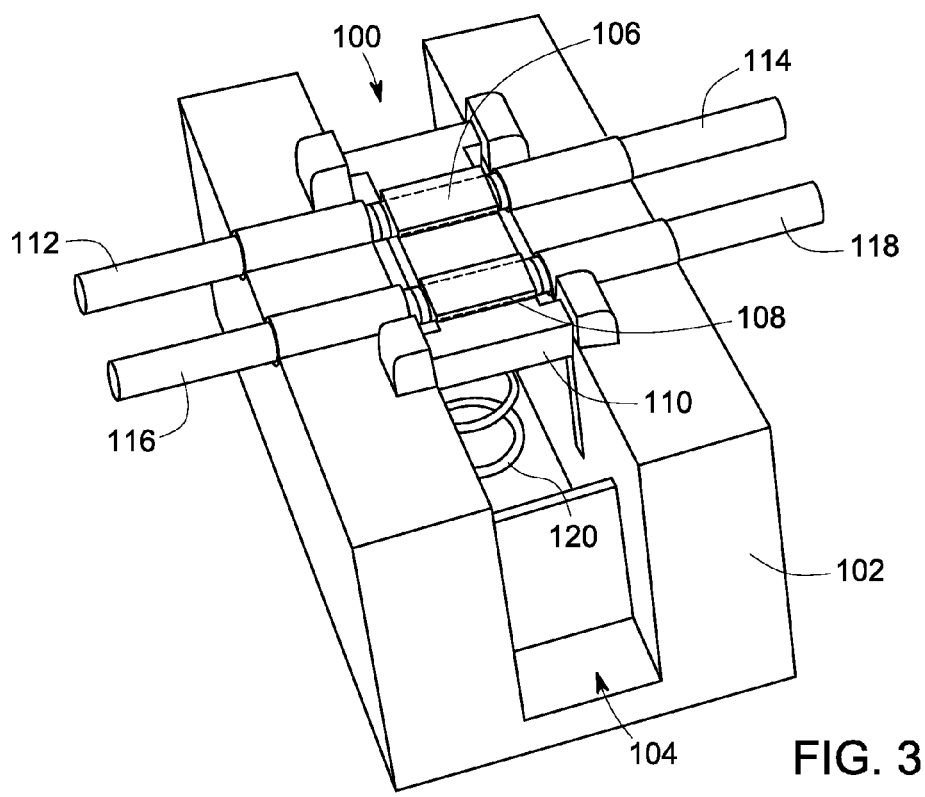
FIG. 3 illustrates an exemplary configuration of the displaceable optical pathway of the serial optical data transmission system of FIG. 1.

FIG. 3 illustrates an exemplary configuration 100 of the displaceable optical pathway of the serial optical data transmission system 10 of FIG. 1. In the illustrated embodiment, the optical pathway 100 is supported by a base 102 and is disposed adjacent to a slot 104 configured to receive a monitoring and/or control module 12 (see FIG. 1). In the illustrated embodiment, width of the optical pathway 100 is substantially same as the width of the slot 104. However, other configurations with width of the optical pathway 100 being different than that of the slot 104 may be envisaged. For example, the slot and/or the pathway may be the same width as the modules that are installed in the system, or a narrower slot and pathway may be provided.

In the illustrated embodiment, the optical pathway 100 includes optical signal transmission conductors 106 and 108 disposed within a housing 110. The optical signal transmission conductors 106 and 108 may include, but are not limited to, plastic, or glass, or combinations thereof. However, other materials suitable for optical transmission may be envisaged. The optical signal transmission conductors 106 and 108 may include unidirectional or bidirectional conductors.

The base 102 includes optical guides such as represented by reference numerals 112, 114, 116 and 118. In the illustrated embodiment, the optical signal transmission conductors 106 and 108 are coupled to optical wave guides 112, 114 and 116, 118 respectively for transmission of optical data, while the optical pathway 100 is disposed within the slot 104. The optical pathway 100 also includes a biasing mechanism, such as a spring 120 for biasing the optical pathway 100 towards a serial optical data bus position upon removal of monitoring and/or control module from the slot 104.

As described above, the base 102 facilitates constraining of the optical signal transmission conductors 106 and 108 of the optical pathway 100 and supports the spring 120 for biasing of the optical pathway 100. In certain embodiments, each of the optical signal transmission conductors 106 and 108 includes more than one conductor disposed within a body or cladding. In one exemplary embodiment, each of the optical signal transmission conductors 106 and 108 includes a plurality of conductors disposed within the cladding. In certain embodiments, each of the optical signal transmission conductors 106 and 108 includes a microlens coupled to each end of the respective optical signal transmission conductors 106 and 108 to reduce optical transmission losses.

Figure 4:
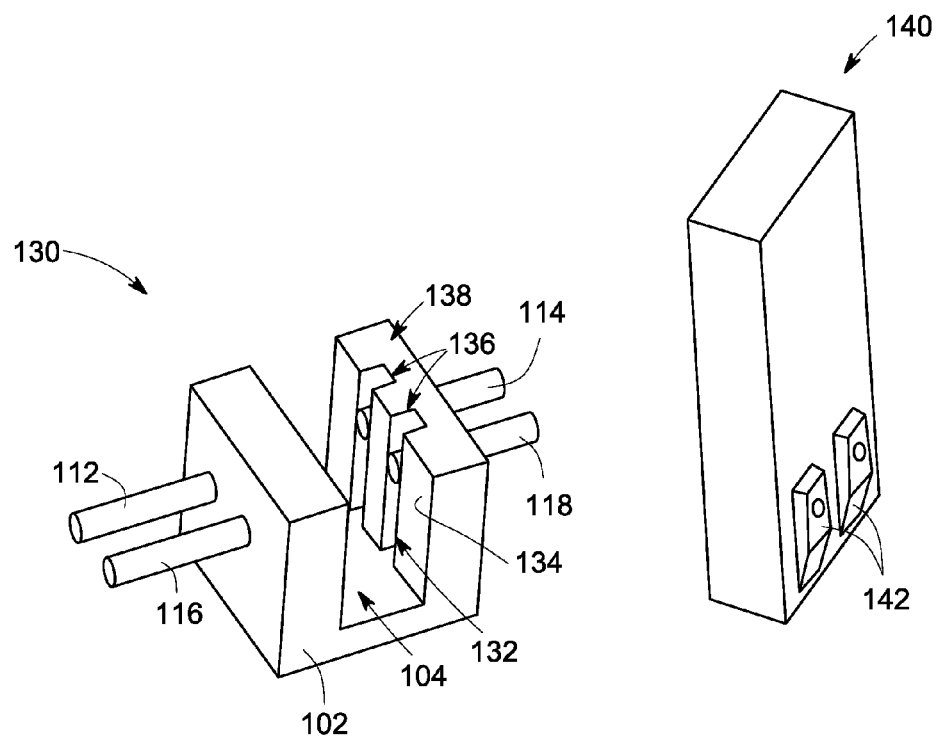
FIG. 4 illustrates another exemplary configuration of base for the displaceable optical pathway of FIG. 3.

FIG. 4 illustrates another exemplary configuration 130 of base 102 for the displaceable optical pathway 100 of FIG. 3. As illustrated, the configuration 130 includes the base 102 configured to provide support to the fiber backplane elements such as the optical guides 112, 114, 116 and 118. In this exemplary embodiment, the base 102 further includes channels 132 disposed on sidewalls such as represented by reference numeral 134 that provide a recess area for the optical pathway 100. In addition, the base 102 includes channels 136 disposed on top surface such as 138 that is configured to guide a monitoring and/or control module 140 within the slot 104.

In the illustrated embodiment, the monitoring and/or control module 140 includes a plurality of wedges such as represented by reference numerals 142 to facilitate deflection of the optical pathway 100 without any damage to the components of the optical pathway 100. In certain embodiments, the wedges 142 facilitate mechanical alignment of the optical signal transmission conductors 106 and 108 of the optical pathway 100. In certain other embodiments, the configuration 130 may include a light pipe configured to provide light path for the optical signals.

Figure 5:
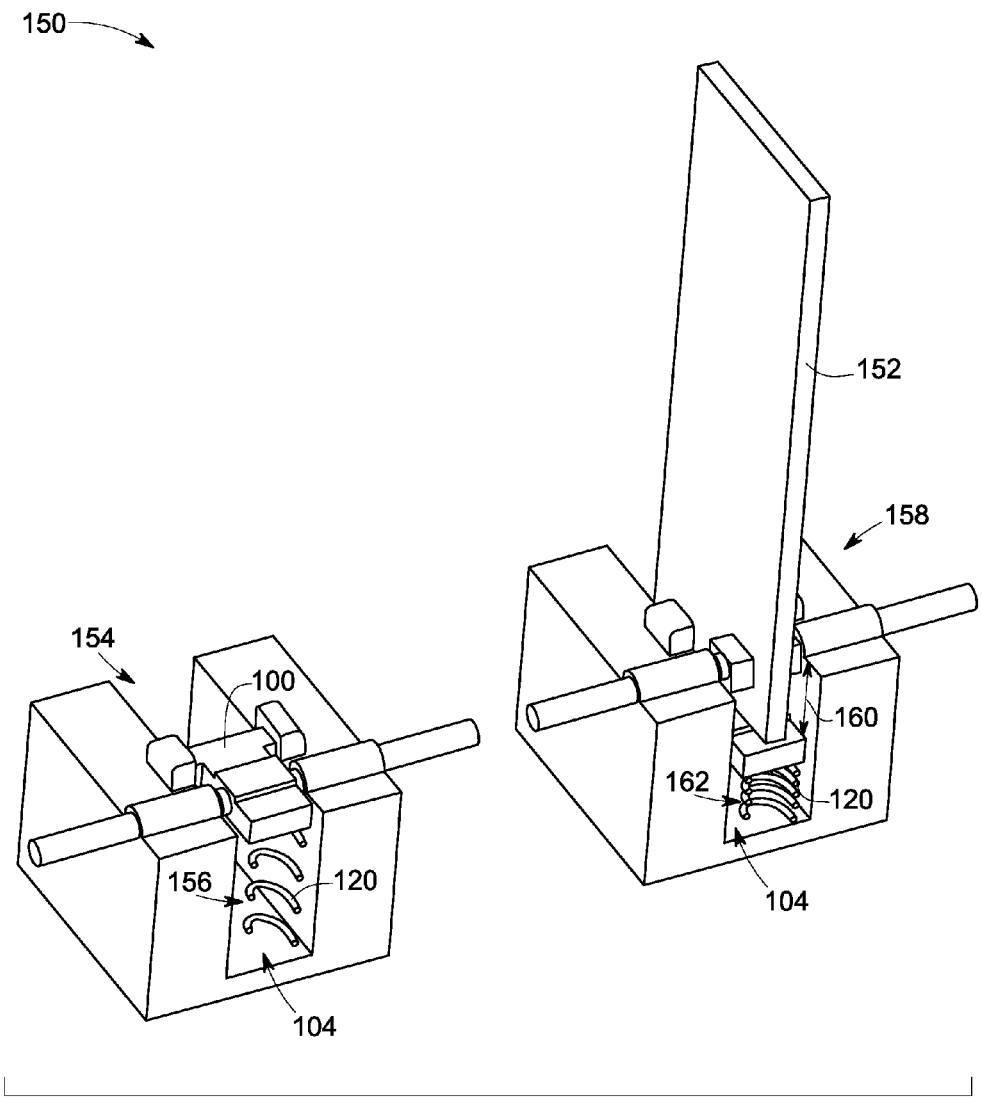
FIG. 5 illustrates cross-sectional views of the displaceable optical pathway without and with a monitoring and/or control module within the slot of the module.

FIG. 5 illustrates cross-sectional views 150 of the displaceable optical pathway 100 without and with a monitoring and/or control module 152 within the slot 104 of FIG. 3. The configuration 154 corresponds to the slot 104 with the optical pathway 100 disposed in the slot 104. In this embodiment, the biasing spring 120 is disposed in a first position 156 to maintain transmission of optical data via the optical pathway 100.

Moreover, the configuration 158 corresponds to the slot 104 with the optical pathway 100 being displaced by the monitoring and/or control module 152. As can be seen, once the monitoring and/or control module 152 is inserted within the slot 104, the module 152 displaces the optical pathway 100 by a distance 160 and the biasing spring 120 is moved to a second position 162. Advantageously, the optical pathway 100 facilitates insertion and removal of modules in the system 10 (see FIG. 1) under power by maintaining an optical coupling between adjacent modules through the optical pathway 100.

In certain embodiments, the optical pathway 100 may be hinged or is elastically bendable on a first end of the slot 104 and may includes a spring that facilitates returning of the optical pathway 100 to its original position when the module 152 is not disposed within the slot 104. In this exemplary configuration, the optical pathway 100 guides the light through the slot 104 while the module 152 is not disposed within the slot 104.

The various aspects of the structures described hereinabove may be used with high speed serial fiber optic backplanes, such as those typically found in monitoring and control systems used in industrial automation applications. As described above, the technique utilizes displaceable optical pathways that facilitate insertion and removal of monitoring and/or control modules from such systems. The optical pathways maintain transmission of optical data by biasing towards a serial optical data bus position upon removal of one or more monitoring and/or control modules. The optical pathways described above facilitate transmission of optical data even when multiple modules, including multiple consecutive modules are missing from the system.

Advantageously, the technique described above provides a high speed serial backplane that has substantial noise immunity and allows removal and insertion under power for use in applications such as Ethernet based serial backplane communications. The technique described above facilitates forming reliable and robust connections while reducing the manufacturing costs and having substantially less heat dissipation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A serial optical data transmission system, comprising:
a displaceable optical pathway disposed adjacent to a slot configured to receive a first monitoring and/or control module, the optical pathway being biased towards a serial optical data bus position for transmission of optical data to or from at least one second monitoring and/or control module when the first monitoring and/or control module is removed from the slot, and the optical pathway being displaced from the serial optical data bus position when the first monitoring and/or control module is in the slot.

2. The system of claim 1, wherein the optical pathway comprises more than one optical signal transmission conductor.

3. The system of claim 1, wherein the optical pathway is biased towards a serial optical data bus position using a mechanical preload.

4. The system of claim 3, wherein the optical pathway is biased towards the serial optical data bus position by a spring.

5. The system of claim 1, comprising circuitry within at least the first monitoring and/or control module for receiving and transmitting optical data to and/or from the second monitoring and/or control module when the first monitoring and/or control module is in the slot.

6. The system of claim 5, wherein the circuitry comprises at least one optical signal transmission conductors for receiving and transmitting optical data to and/or from optical transmit and receive components of the second monitoring and/or control module.

7. The system of claim 5, wherein the circuitry includes a switch having a first state in which the switch passes the optical data along to or from at least one other monitoring and/or control module, and a second state in which the switch passes the optical data to other circuitry within the first monitoring and/or control module.

8. The system of claim 7, wherein the other circuitry includes receiving and transmitting circuitry within the first monitoring and/or control module configured to receive the optical data, and retransmit the optical data to at least one other monitoring and/or control module.

9. The system of claim 8, comprising processing circuitry within the first monitoring and/or control module coupled to the receiving and transmitting circuitry and configured to perform a monitoring and/or control function for a machine system based upon the optical data.

10. A serial optical data transmission system, comprising:
a plurality of monitoring and/or control modules configured to perform monitoring and/or control function for a machine system;
a serial optical backplane disposed adjacent to the plurality of monitoring and/or control modules, the serial optical backplane comprising a plurality of displaceable optical pathways disposed on the serial optical backplane, wherein each of the plurality of displaceable optical pathways is configured to be biased towards a serial optical data bus position upon removal of one or more monitoring and/or control modules and is configured to maintain transmission of optical data between the other monitoring and/or control modules of the serial optical data transmission system.

11. The system of claim 10, wherein each of the plurality of displaceable optical pathways is disposed adjacent to a slot configured to receive a monitoring and/or control module, the optical pathway being biased towards the serial optical data bus position for transmission of optical data to or from at least one other monitoring and/or control module when the monitoring and/or control module is removed from a respective slot, and the respective optical pathway being displaced from the serial optical data bus position when the monitoring and/or control module is in the respective slot.

12. The system of claim 11, comprising circuitry within at least the monitoring and/or control module for receiving and transmitting optical data to and/or from the other monitoring and/or control module when the monitoring and/or control module is in the slot.

13. The system of claim 12, wherein the circuitry comprises at least one unidirectional or bidirectional optical signal transmission conductor disposed within a housing and configured to receive and transmit optical data to and/or from optical transmit and receive components of the second monitoring and/or control module.

14. A serial optical backplane supporting a plurality of monitoring and/or control modules, the backplane comprising a plurality of displaceable optical pathways, each optical pathway being configured to maintain transmission of optical data between the monitoring and/or control modules by biasing towards a serial optical data bus position upon removal of one or more monitoring and/or control modules from the backplane.

15. The serial optical backplane of claim 14, wherein the displaceable optical pathway comprises more than one optical signal transmission conductor.

16. The serial optical backplane of claim 15, wherein each optical signal transmission conductor comprises at least one optical conductor within a cladding of the optical signal transmission conductor.

17. The serial optical backplane of claim 15, wherein each optical signal transmission conductor comprises a microlens coupled to each end of the optical signal conductor.

18. The serial optical backplane of claim 14, wherein each of the plurality of displaceable optical pathways is disposed adjacent to a slot configured to receive first or second monitoring and/or control modules, the optical pathway being biased towards the serial optical data bus position by a spring for transmission of optical data to or from at least one second monitoring and/or control module when the first monitoring and/or control module is removed from the slot.

19. The serial optical backplane of claim 18, wherein the displaceable optical pathway is hinged to a first end of the slot and wherein the spring facilitates return of the optical pathway to its original position while the first monitoring and/or control module is removed from the slot.

20. The serial optical backplane of claim 18, wherein each of the plurality of displaceable optical pathways is supported by a base and wherein the base comprises:
a first set of channels disposed on sidewalls of the base, the channels being configured to provide a recess area for the optical pathway; and
a second set of channels disposed on top surface of the base, the channels being configured to guide the first monitoring and/or control module within the slot.

* * * * *